United States Patent [19]
Zimmermann et al.

[11] 4,410,977
[45] Oct. 18, 1983

[54] TURNTABLE FOR RECORD PLAYERS

[76] Inventors: Heinrich Zimmermann, Joh.-Seb.-Bach-Str. 14; Sepp-Dieter Bierleutgeb, Kinzigstr. 24, both of 7742 St. Georgen, Fed. Rep. of Germany

[21] Appl. No.: 276,287

[22] Filed: Jun. 22, 1981

[30] Foreign Application Priority Data

Apr. 11, 1981 [DE] Fed. Rep. of Germany ....... 3114715

[51] Int. Cl.³ .................... G11B 17/02; G11B 25/00
[52] U.S. Cl. .................................................. 369/264
[58] Field of Search ............... 369/264, 277, 292, 270, 369/271; 84/97, 98, 99, 100, 414

[56] References Cited

U.S. PATENT DOCUMENTS 3,214,178 10/1965 Warnke ............................. 369/277
3,997,174 12/1976 Kawashima ....................... 369/271

FOREIGN PATENT DOCUMENTS 2658993 6/1978 Fed. Rep. of Germany ...... 369/264
2731429 1/1979 Fed. Rep. of Germany ...... 369/264

Primary Examiner—Steven L. Stephan
Attorney, Agent, or Firm—Horst M. Kasper

[57] ABSTRACT

A turntable for a record player having an additional weight arranged elastically in the region of the edge of the turntable in such a manner that the weight is made useful not only for increasing the moment of inertia, but also for damping oscillations of the turntable itself.

6 Claims, 3 Drawing Figures

TURNTABLE FOR RECORD PLAYERS

The present invention relates to a turntable for a record player having an additional weight of heavy material arranged in the region of its periphery in order to increase the moment of inertia.

It is known (West German OS No. 27 31 429) to increase the moment of inertia of the turntable by arranging an additional weight in the region of its edge. The advantage of such an arrangement is that the turntable can be manufactured more cheaply for the same moment of inertia than if it consisted of a uniform material such as, for instance, die cast aluminum. As a rule it is desirable to make the turntable as stable as possible so as to have as firm as possible a base for the placing on of the phonograph record. In order that the surface of the phonograph record not be damaged it is customary to provide the turntable with an elastic cover. Since the phonograph record in its turn is readily flexible, there results, in combination with the cover of the turntable, an oscillatory structure which can have a disturbing effect on reproduction if it is excited. Excitations of oscillation can result from oscillations of the turntable itself, which occur in particular in the region of the edge of the turntable. The region of the edge has particular importance as a source excitation since the phonograph record advisedly is supported at its edge. Disturbing oscillations can be avoided by making the turntable itself very stiff, which can be done, for instance, by correspondingly high ribbing in the case of a cast turntable. Such ribbing is, however, not always possible and it is not cheap.

In accordance with one arrangement present on the market, a rubber mat is cemented on the bottom of the turntable in order to eliminate these disturbances, which, on the one hand represents a not inconsiderable increase in expense and on the other hand is, however, of only slight effect. Furthermore, thick cover mats for the turntable are available on the market in order to eliminate such disturbances. However, they are very expensive.

The object of the present invention is to damp the natural oscillations of turntables which contain an additional weight and to do so in a simple and inexpensive manner.

In accordance with the present invention, this additional weight (3, 7) for the dampening of oscillations of the turntable (1) is fastened to the turntable (1) with the interposition of elastic material (4, 8). The essence of the invention is to use the additional weight simultaneously for an oscillatable damping system, in which connection damping merely of the edge regions surprisingly has been found effective for the entire area of the turntable.

Furthermore, in accordance with the invention the additional weight comprises a lead wire (3) and the elastic material has the form of a covering (4) which surrounds the lead wire (3) and is fastened in a groove (2) which is located concentric to the axis (9) of the turntable.

Furthermore, in accordance with the invention the additional weight comprises lead balls (7) which are embedded in elastic material (8), which is fastened in a groove (2) arranged concentric to the axle (9) of the turntable.

With the above and other objects and advantages in view, the present invention will become more clearly understood in connection with the detailed description of preferred embodiments, when considered with the accompanying drawings, of which:

Figure 1:
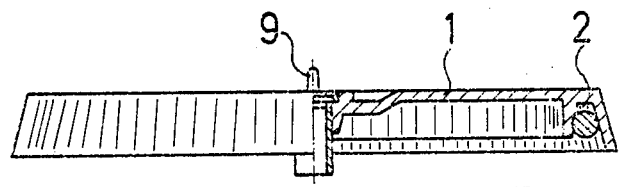
FIG. 1 shows a turntable, partially in cross section.
Figure 2:
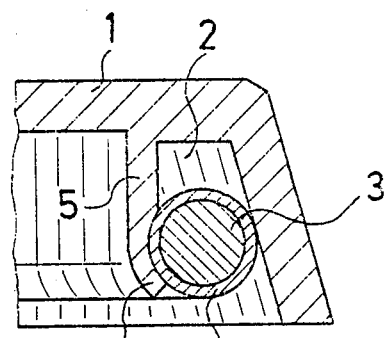
FIGS. 2 and 3 are other embodiments of the region of the edge of the turntable.

At the edge of the turntable 1 there is a groove 2 in which a lead wire 3 bearing a plastic covering 4 is embedded. By the selection of the material and thickness of the covering 4 as well as the size of its area of contact with the turntable 1, the best elasticity in each individual case can be determined. For a turntable of a weight of 700 g a lead wire of 7 mm $\phi$ with a PVC covering of a thickness of 0.5 mm has proven best. The use of a plastic-covered wire has the particular advantage that the elastic material can be applied very inexpensively since, on the one hand, the manufacture of a coated wire is an ordinary mass production process and on the other hand the attachment of such a wire to the turntable can be effected in very simple manner. For this purpose, the inner collar 5 of the turntable 1, which forms groove 2, need simply be slightly bent over at its end 6 after the insertion of the wire 3.

Figure 3:
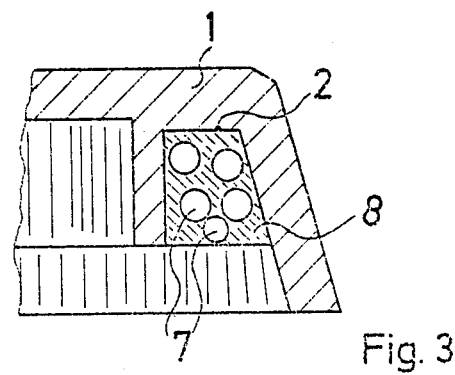

Another embodiment of the elastic attachment of the weight is shown in FIG. 3. Here granulate 7 is arranged by means of an elastic mass 8 within a groove 2 at the periphery of the turntable. The granulate 7 can be lead balls and the elastic mass can be, for example,

We claim:

1. A turntable for a record player comprising
   a turntable body,
   an additional weight of heavy material, the density of which exceeds that of said turntable body, said additional weight arranged in a region of the periphery of the turntable body, whereby the moment of inertia of the turntable body is increased about any axis through the center of the turntable body,
   means comprising a solid elastic material arranged to attach said additional weight to the turntable body and forming therewith an energy absorbing structure, which structure damps oscillations in the turntable periphery.

2. The turntable according to claim 1, wherein said turntable is formed with a groove located in said region of the periphery of the turntable body, concentric to an axle of the turntable,
   a wire made of lead constitutes said additional weight,
   wherein the means comprising solid elastic material is provided as a covering surrounding said lead wire, which covering holds the lead wire within said groove of the turntable.

3. The turntable according to claim 1, wherein
   said turntable body is formed with a groove located in said region of the periphery of the turntable concentric to an axle of the turntable,
   said elastic material is fastened in said groove of the turntable,
   lead balls constituting said additional weight are embedded in said solid elastic material.

4. The turntable according to claim 2 or 3, wherein said turntable body has a downwardly extending collar spaced inwardly from a peripheral edge of the turntable and defining said groove therebetween.

5. The turntable according to claim 4, wherein said collar has a free end bent slightly toward said perpheral edge of the turntable.

6. The turntable according to claim 2 or 3, wherein said additional weight extends uniformly annularly around said turntable in said peripheral region.

* * * * *